US012359472B2

(12) United States Patent
Kelsch et al.

(10) Patent No.: US 12,359,472 B2
(45) Date of Patent: Jul. 15, 2025

(54) ANTI-THEFT APPARATUS FOR RETAIL DISPLAY OF A LAPTOP COMPUTER

(71) Applicants: Christopher A. Kelsch, Palm Harbor, FL (US); Vanguard Products Group, Inc., Oldsmar, FL (US)

(72) Inventors: Christopher A. Kelsch, Palm Harbor, FL (US); William Claude Chazotte, Brooksville, FL (US); Wade Zhu, Land O'Lakes, FL (US); Douglas Barthold, Oldsmar, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 0 days.

(21) Appl. No.: 18/815,490

(22) Filed: Aug. 26, 2024

(65) Prior Publication Data

US 2025/0067089 A1 Feb. 27, 2025

Related U.S. Application Data

(60) Provisional application No. 63/578,636, filed on Aug. 24, 2023.

(51) Int. Cl.
*E05B 73/00* (2006.01)
*E05B 47/00* (2006.01)

(52) U.S. Cl.
CPC ...... *E05B 73/0082* (2013.01); *E05B 47/0004* (2013.01); *E05B 2047/0016* (2013.01)

(58) Field of Classification Search
CPC .. E05B 73/0082; E05B 73/00; E05B 47/0004; E05B 2047/0016; F16M 13/02; Y10T 70/5009
USPC .............................................................. 70/62
See application file for complete search history.

(56) References Cited

U.S. PATENT DOCUMENTS

| | | | |
|---|---|---|---|
| 6,831,560 | B2 | 12/2004 | Gresset |
| 7,053,774 | B2 | 5/2006 | Sedon et al. |
| 9,097,380 | B2 | 8/2015 | Wheeler |
| 9,159,309 | B2 | 10/2015 | Liu et al. |
| 9,161,466 | B2 | 10/2015 | Huang |
| 9,936,823 | B2 | 4/2018 | Galant |
| 10,001,153 | B1 | 6/2018 | Fan |

(Continued)

FOREIGN PATENT DOCUMENTS

WO WO 2021/011625 A1 1/2021

*Primary Examiner* — Suzanne L Barrett
(74) *Attorney, Agent, or Firm* — Andriy Lytvyn; Hill Ward Henderson, P.A.

(57) ABSTRACT

An anti-theft device for securing a laptop computer or a similar electronic device against theft. The anti-theft device has a stand that mounts onto a display surface. A pair of arms is disposed in a linear sliding relationship relative to a housing affixed to the stand. The arms terminate with inwardly grips that receive the opposing edges of a lid portion of a laptop. The arms have gear racks operatively engaged by a pinion gear, which is joined to a concentrically aligned ratchet gear. A pawl operatively engages the ratchet gear, permitting the ratchet gear and the pinion gear to rotate only in one direction, while precluding reverse rotation. Thus, the adjustable arms can inwardly retract while the pawl engages the ratchet gear, but cannot outwardly extend. A solenoid is disposed within the housing and, when energized, retracts the pawl away from the ratchet gear, thus unlocking the arms.

20 Claims, 6 Drawing Sheets

(56) References Cited

U.S. PATENT DOCUMENTS

| | | | | |
|---|---|---|---|---|
| 10,165,873 | B2 | 1/2019 | Gulick, Jr. et al. | |
| 10,323,440 | B1 | 6/2019 | Kelsch et al. | |
| 10,378,248 | B1 | 8/2019 | Kelsch et al. | |
| 10,394,297 | B1 | 8/2019 | Han | |
| 10,448,759 | B1 | 10/2019 | Chapuis et al. | |
| 10,492,322 | B1 | 11/2019 | Fan | |
| 10,793,080 | B2 | 10/2020 | Zhang | |
| 11,035,151 | B2 | 6/2021 | Kelsch et al. | |
| 11,178,983 | B1 | 11/2021 | Kelsch et al. | |
| 11,401,738 | B1 * | 8/2022 | Kelsch | E05B 47/0012 |
| 11,714,454 | B1 | 8/2023 | Wu et al. | |
| 11,781,348 | B2 * | 10/2023 | Schuft | E05B 73/00 248/551 |
| 11,952,803 | B1 * | 4/2024 | Kelsch | E05B 47/0001 |
| 12,013,076 | B1 | 6/2024 | Penny et al. | |
| 2005/0063125 | A1 | 3/2005 | Kato | |
| 2014/0060218 | A1 | 3/2014 | Bisesti et al. | |
| 2015/0060624 | A1 * | 3/2015 | Huang | F16M 11/105 248/316.4 |
| 2015/0186685 | A1 * | 7/2015 | Vroom | F16H 35/10 726/35 |
| 2015/0300050 | A1 | 10/2015 | Van Balen | |
| 2016/0201359 | A1 | 7/2016 | Berglund et al. | |
| 2016/0335860 | A1 | 11/2016 | Richardson et al. | |
| 2017/0049251 | A1 | 2/2017 | Gulick, Jr. et al. | |
| 2018/0258669 | A1 | 9/2018 | Moock et al. | |
| 2018/0266457 | A1 | 9/2018 | Du | |
| 2018/0295733 | A1 | 10/2018 | Wen et al. | |
| 2018/0342136 | A1 | 11/2018 | Hartweg et al. | |
| 2019/0125104 | A1 | 5/2019 | Gulick, Jr. et al. | |
| 2019/0178010 | A1 | 6/2019 | Moock et al. | |
| 2019/0316386 | A1 | 10/2019 | Gulick, Jr. et al. | |
| 2020/0040614 | A1 * | 2/2020 | Kelsch | E05B 73/0082 |
| 2020/0073438 | A1 * | 3/2020 | Huang | G06F 1/1624 |
| 2020/0107653 | A1 | 4/2020 | Leyden et al. | |
| 2020/0347648 | A1 | 11/2020 | Moock et al. | |
| 2021/0001782 | A1 | 1/2021 | Liu | |
| 2021/0040779 | A1 | 2/2021 | Kelsch et al. | |
| 2021/0059437 | A1 * | 3/2021 | Chapuis | F16M 11/04 |
| 2021/0123268 | A1 | 4/2021 | Gulick, Jr. et al. | |
| 2021/0169239 | A1 | 6/2021 | Gulick, Jr. et al. | |
| 2021/0228000 | A1 * | 7/2021 | Schuft | E05B 73/0017 |
| 2023/0407683 | A1 * | 12/2023 | Penny | E05B 73/0017 |
| 2024/0328211 | A1 * | 10/2024 | Naderzad | E05B 73/0082 |
| 2024/0375275 | A1 * | 11/2024 | Zimmer | B25J 9/1661 |

* cited by examiner

ANTI-THEFT APPARATUS FOR RETAIL DISPLAY OF A LAPTOP COMPUTER

PRIORITY CLAIM

This non-provisional patent application claims priority to the U.S. Provisional Application No. 63/578,636 filed on Aug. 24, 2023.

BACKGROUND OF THE INVENTION

1. Field of the Invention

This invention relates to merchandise anti-theft devices. More specifically, it relates to an anti-theft device for a retail display of a laptop computer.

2. Brief Description of the Related Art

Retailers often prefer to present their merchandise to consumers in a manner that allows the consumers to touch, inspect, and otherwise interact with the products at a display counter. Many merchandise items, especially portable electronic devices, are relatively expensive and, therefore, are under a serious threat of theft. Retailers often face a dilemma pertaining to how to interactively display their merchandise to attract customers and increase sales, while, at the same time, safeguarding the merchandise against theft. There is an unresolved need for an anti-theft device for a laptop computer having adjustable, lockable arms that can accommodate various computer sizes, wherein store personnel can unlock the adjustable arms using a wireless means, such as a key fob.

SUMMARY OF THE INVENTION

In an embodiment, the invention may be an anti-theft device for a laptop computer. The anti-theft device includes a stand that has a base portion configured to be anchored to a display surface and configured to support a body of the laptop computer thereon. The stand may have an angular configuration that includes a lateral portion joined at an angle to the base portion. A housing may be affixed to the lateral portion of the stand. The anti-theft device further includes one or more adjustable arms. The adjustable arm has a first portion slidingly disposed within the housing and a second portion positioned outside the housing and terminating with a grip.

The grip may be U-shaped and may be configured to receive an edge of a lid portion of the laptop computer. The U-shaped configuration of the grip permits the edge of the lid portion of the laptop to translate in a transverse direction relative thereto. Furthermore, in an embodiment, the grip does not engage the base portion of the laptop computer while the base portion is at rest. Thus, the laptop computer may be lifted from the stand and raised to a height until the base portion of the laptop engages the grips, which will preclude the base portion from being raised any higher. When the laptop computer is lifted or lowered in such manner, the edge of the lid portion translates transversely within the U-shaped grip while remaining secured therein.

The adjustable arm includes a gear rack disposed along the portion of the arm that is slidingly disposed within the housing. A pinion gear is rotationally disposed within the housing and operatively engaged with the gear rack of the adjustable arm. Due to this engagement, inward retraction of the adjustable arm relative to the housing requires the pinion gear to rotate in a first direction, while outward extension of the adjustable arm relative to the housing requires the pinion gear to rotate in the second, opposite direction.

In an embodiment, the adjustable arm may have a window into which the pinion gear is placed. The gear rack may be disposed on a longitudinal inner edge of the window. When the arm is extended outwardly relative to the housing by a maxim permitted distance, the terminal edge of the window will abut the pinion gear, and in this manner, the adjustable arm will be restricted against further outward extension, thereby precluding removal of the adjustable arm from the housing.

A ratchet gear is also rotationally disposed within the housing and is joined to the pinion gear in a concentric alignment. The pinion gear and the ratchet gear collectively form a gear assembly. A pawl is pivotally disposed within the housing and operatively engages the ratchet gear. The pawl permits the gear assembly to rotate in the first direction, but precludes the gear assembly from rotating in the second direction. Therefore, the engagement between the pawl and the ratchet gear enables the adjustable arm to retract inwardly relative to the housing, but precludes the adjustable arm from extending outwardly relative to the housing. In this manner, the pawl, which is a part of the locking mechanism, locks the adjustable arm in place to secure the laptop within the anti-theft device.

The locking mechanism further includes a biasing element, such as a coil spring, which is operatively connected to the pawl. The biasing element applies a biasing force onto the pawl, urging it into the operative engagement with the ratchet gear.

The locking mechanism further includes an actuator disposed within the housing. In an actuated state, the actuator counteracts the biasing force of the biasing element, therefore disengaging the pawl from the ratchet gear. When the pawl is disengaged from the ratchet gear, the gear assembly can rotate in the second direction, thereby permitting the adjustable arm to extend outwardly relative to the housing. Thus, when the actuator is in the actuated state, the adjustable arm can be extended into an open position in which the grip disengages the edge of the lid portion of the laptop computer, permitting removal thereof from the stand.

In an embodiment, the actuator is a solenoid. The solenoid may be electrically connected, via a switch, to a power source (such as a battery), which may be disposed within the housing or externally to the anti-theft device. The switch has a closed state in which a closed electrical circuit is formed between the power source and the solenoid and an open state in which the electrical circuit therebetween is broken. When the switch is closed, the solenoid is energized (actuated), and when the switch is open, the solenoid is de-energized. The pawl is configured to pivot about a fulcrum and has a tail portion positioned on the opposite side of the fulcrum relative to the pawl's operating end. When the solenoid is energized, its piston applies a force onto the tail of the pawl, which causes the pawl to pivot about the fulcrum, disengaging the operating end thereof from the ratchet gear. And, as explained above, when the pawl is disengaged from the ratchet gear, the gear assembly (including the pinion gear) can rotate in reverse, thereby permitting the adjustable arm to be extended outwardly relative to the housing such that the grip can be removed from the edge of the laptop's lid portion.

The anti-theft device may further include a fob configured to transmit a signal, while a receiver disposed within the housing is configured to detect that signal. When receiver detects a predefined signal, the receiver triggers the closing of the switch, thereby energizing the solenoid to disengage the pawl from the ratchet gear. Likewise, another signal transmitted by the fob may trigger the opening of the switch, thereby de-energizing the solenoid and returning the pawl into operative engagement with the ratchet gear.

In an embodiment, the anti-theft device may include a second adjustable arm with a second grip. The second adjustable arm may also be slidingly disposed within the housing, in an opposite configuration relative to the first arm, so that the first and the second grips are positioned on the opposite sides of the housing and are configured to receive opposite edges of the lid portion of the laptop computer. The second adjustable arm has a second gear rack disposed therealong and operatively engages the pinion gear. The gear racks of the first and the second arms are positioned on the opposite sides of the pinion gear, such that the pinion gear translates linear movement of the first adjustable arm to the second adjustable arm, thereby synchronizing inward retraction and outward extension of the adjustable arms. This feature ensures that the grips are equidistant relative to the center of the stand, thereby facilitating attractive central display of the laptop.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1A:
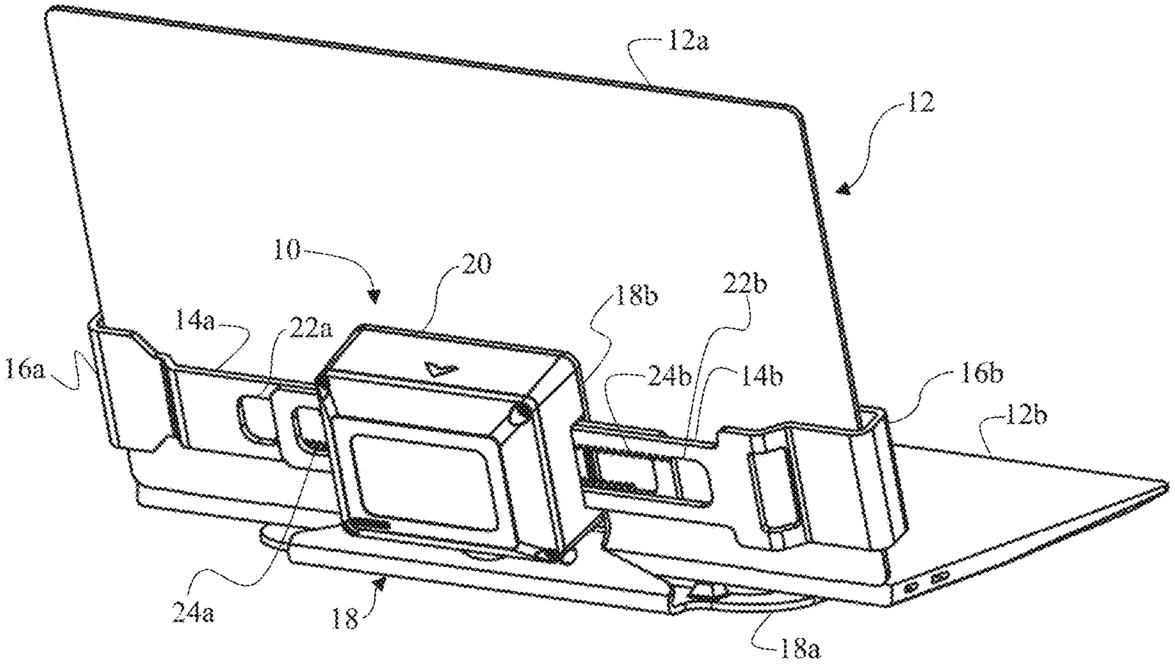
FIG. 1A is a perspective back view depicting a laptop computer secured within the locked arms of the anti-theft device.
Figure 1B:
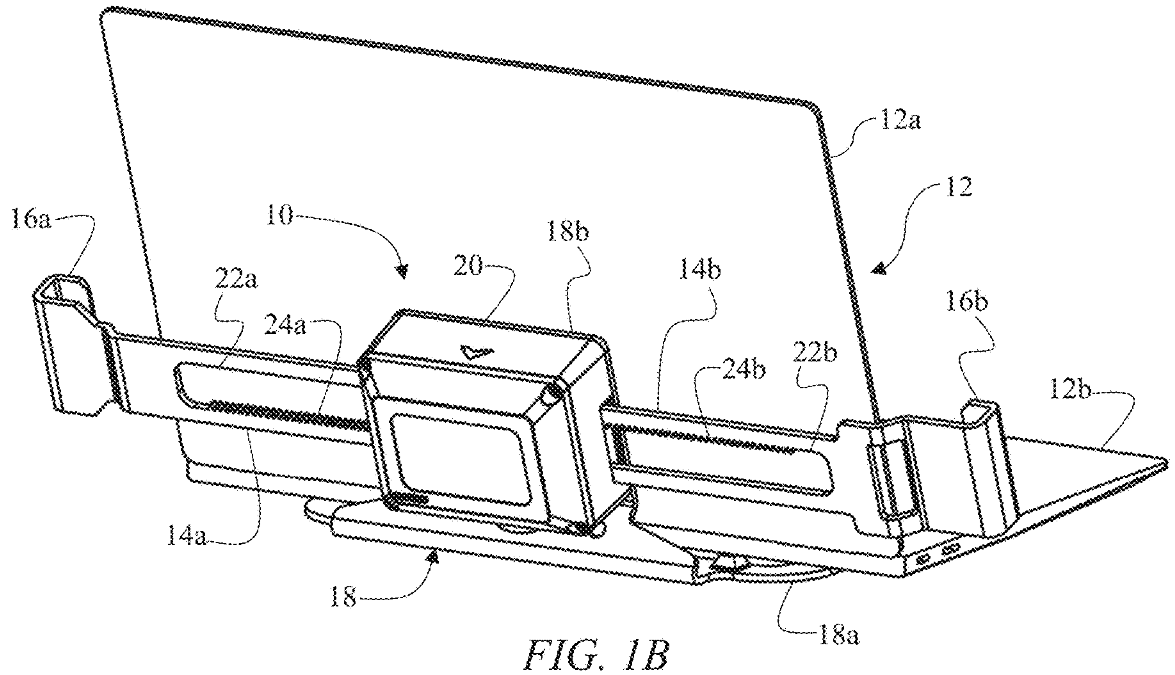
FIG. 1B is a perspective back view depicting the anti-theft device in an unlocked configuration.

FIGS. 1A-1B depict an anti-theft device 10 for securing a laptop 12. The anti-theft device 10 has adjustable arms 14*a* and 14*b* which terminate with U-shaped grips 16*a* and 16*b*, respectively. When the adjustable arms 14*a* and 14*b* are in their closed positions depicted in FIG. 1A, the U-shaped grips 16*a* and 16*b* receive the opposite edges of the lid portion 12*a* of the laptop computer 12. FIG. 1B depicts an open configuration of the adjustable arms 14*a* and 14*b*, in which U-shaped grips 16*a* and 16*b* are separated by a distance exceeding the width of the laptop 12, thereby permitting its removal.

Figure 2:
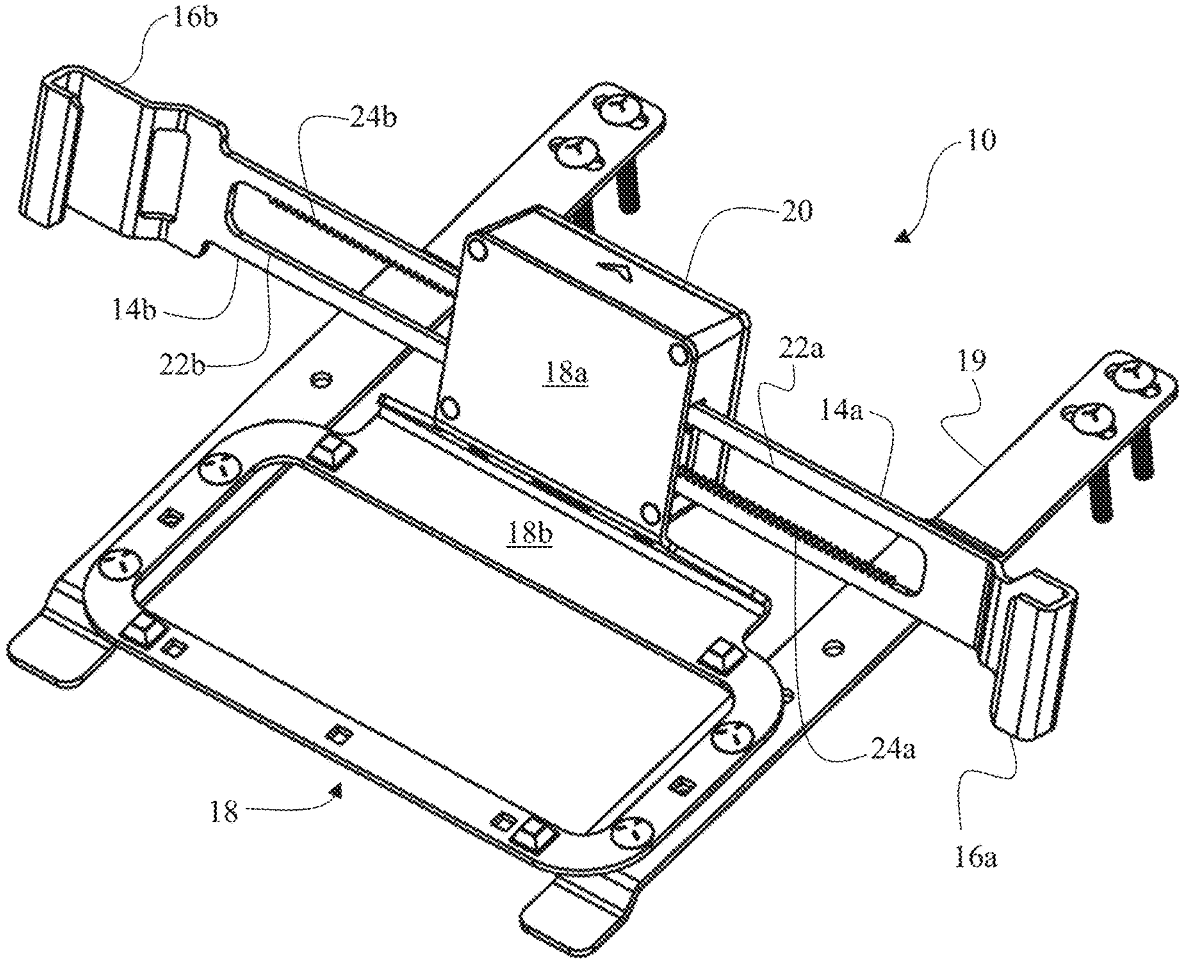
FIG. 2 is a perspective front view of an embodiment of the anti-theft device.

FIG. 2 depicts that the anti-theft device 10 comprises a stand 18 configured to be mounted directly to a retail display counter or to a specialized frame 19. The stand 18 has an angled configuration that includes a base portion 18*a* and a lateral portion 18*b*. A housing 20 is affixed to the lateral portion 18*b* of the stand 18.

Figure 3A:
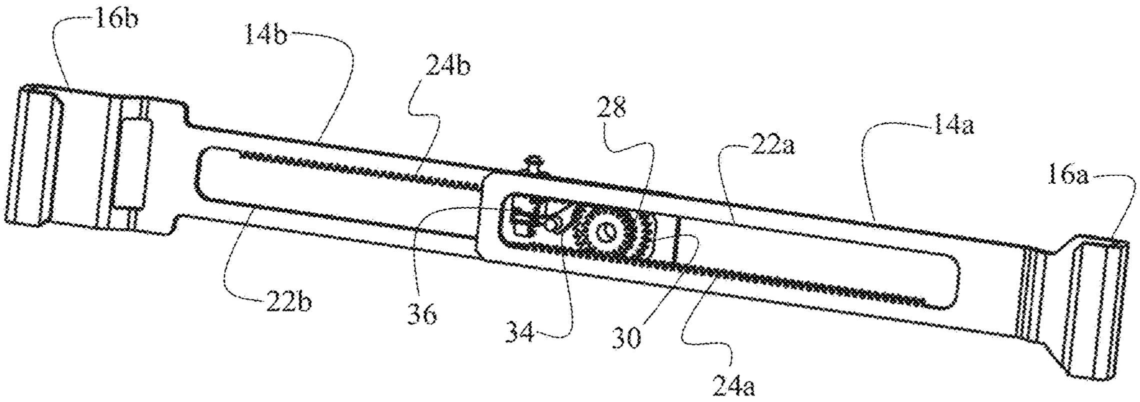
FIG. 3A is a front view of the adjustable arms and the locking mechanism.
Figure 3B:
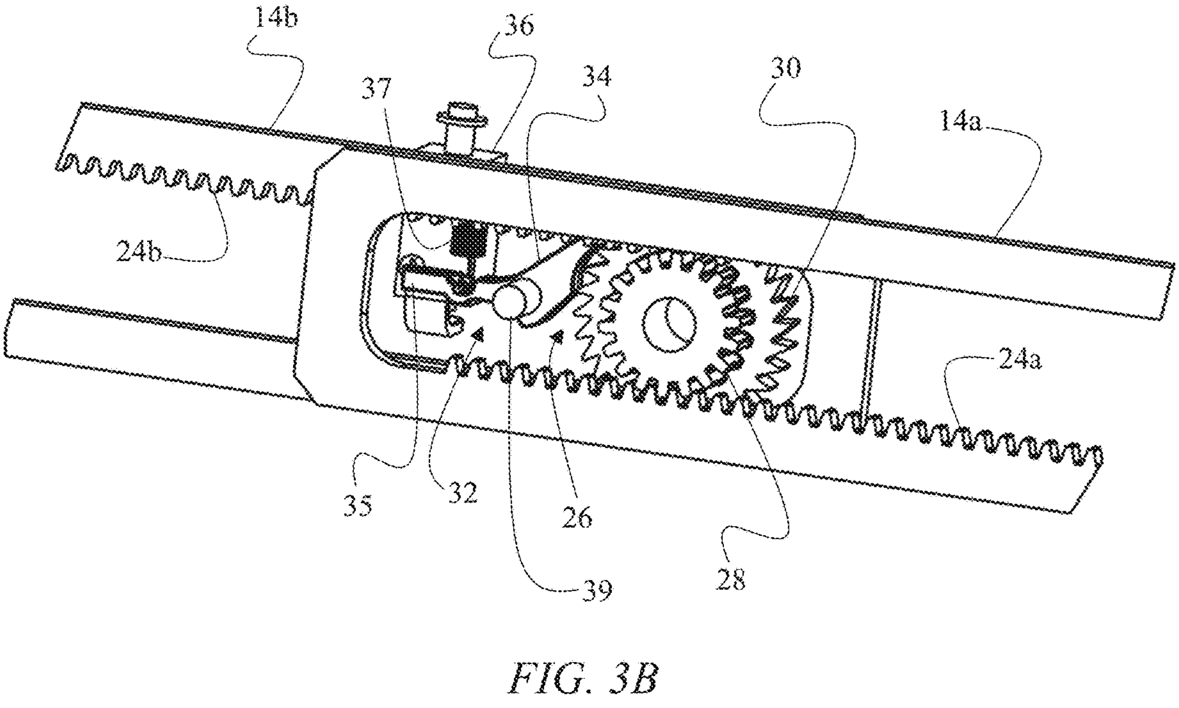
FIG. 3B is a front detail view of the adjustable arms and the locking mechanism.

FIGS. 3A and 3B show that the adjustable arms 14*a* and 14*b* are partially disposed within the housing 20 in an overlapping relationship—i.e., the arm 14*b* is positioned behind the arm 14*a*. The arms 14*a* and 14*b* are configured to linearly translate relative to the housing 20 in an inwardly retracting and outwardly extending manner. The housing 20 may have a track that constrains the movement of the arms 14*a* and 14*b* solely to linear translation relative to the housing. FIGS. 3A and 3B further show that the first arm 14*a* has a first longitudinal window 22*a*, while the second arm 14*b* has a second longitudinal window 22*b*. A first gear rack 24*a* is disposed along the bottom edge of the first window 22*a*, and the second gear rack 24*b* is disposed along the top edge of the second window 22*b*. In this manner, the gear racks 24*a* and 24*b* are disposed in an opposing relation with respect to one another.

The adjustable arms 14*a* and 14*b* terminate with U-shaped grips 16*a* and 16*b*, respectively. The U-shaped grips 16*a* and 16*b* are offset toward the front relative to the arms 14*a* and 14*b*, providing sufficient clearance for the lid portion 12*a* of the laptop computer 12 relative to the lateral portion 18*b* of the stand 18. Furthermore, the grips 16*a* and 16*b* are positioned above the body portion 12*b* of the laptop computer 12 and do not restrict the body portion 12*b* from being lifted from the stand 18. In this manner, a customer can lift the laptop computer 12 from the stand 18 to feel its actual weight. When a customer lifts the laptop computer 12, its lid portion 12*a* will slide within the U-shaped grips 16*a* and 16*b*, until the base portion 12*b* of the laptop 12 contacts the bottom edges of the U-shaped grips 16*a* and 16*b*. In this manner, the customer can feel the true weight of the laptop 12, without compromising security.

Figure 4A:
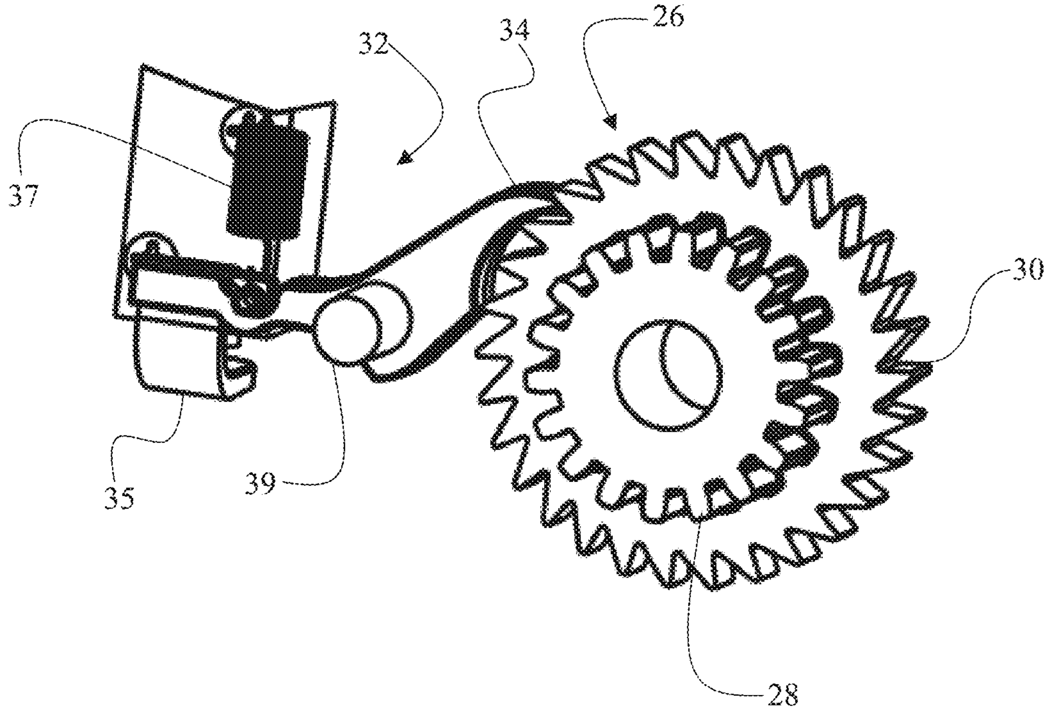
FIG. 4A is a front view of the locking mechanism engaging the gear assembly in a locking configuration of the anti-theft device.
Figure 4B:
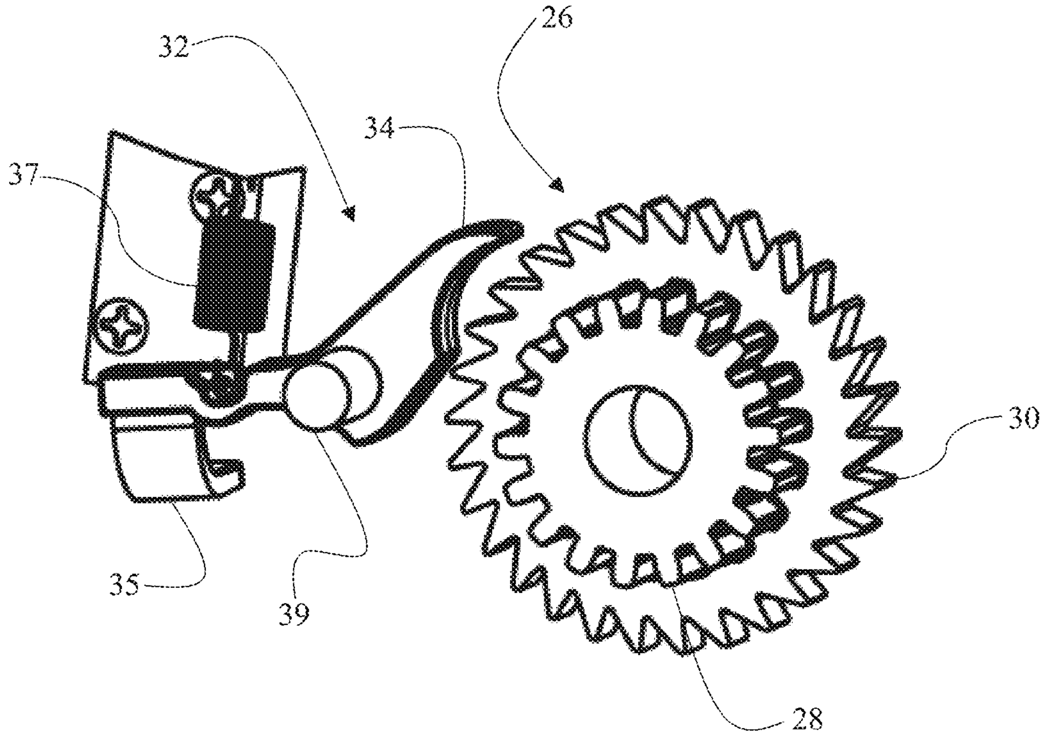
FIG. 4B is a front view of the locking mechanism disengaged from the gear assembly in an unlocked configuration of the anti-theft device.

FIGS. 4A and 4B depict a gear assembly 26, which is rotationally disposed within the housing 20. The gear assembly 26 includes a pinion gear 28 and a ratchet gear 30. The pinion gear 28 and the ratchet gear 30 are concentric and are fixedly joined together. The gears 28 and 30 can either be joined together in any manner known in the art including using fasteners, adhesive, welding or the gear assembly may be manufactured as a monolithic component.

The pinion gear 28 is positioned within the windows 22*a* and 22*b* of arms 14*a* and 14*b*, while the ratchet gear 30 is positioned outside the windows 22*a* and 22*b*, behind the arms 14*a* and 14*b*. The pinion gear 28 operatively engages both gear racks 24*a* and 24*b*. Because the gear racks 24*a* and 24*b* are oriented in an opposing manner, the pinion gear 28 synchronizes their movement relative to one another, whereby an inward linear displacement of the first arm 14*a* causes the pinion gear 28 to rotate, and this rotation causes the second arm 14*b* to also move inwardly by the same distance as the first arm 14*a*. Thus, when a user slides the first arm 14*a* inwardly relative to the housing 20, the second arm 14*b* also slides inwardly relative to the housing 20 by the same distance. Analogously, when the arm 14*a* is extended relative to the housing 20, the pinion gear 28 translates that displacement to the arm 14*b*, causing it to extend by the same distance. In this manner, arms 14*a* and 14*b* are configured to always be equidistant relative to the housing 20, thereby automatically aligning the laptop computer 12 in the center of the anti-theft device 10, which facilitates a neat and attractive display.

FIGS. 4A and 4B further depict a locking mechanism 32. FIG. 4A shows that the locking mechanism 32 comprises a pawl 34 that engages the ratchet gear 30, thereby precluding the gear assembly 26 from rotating in reverse, including the pinion gear 28. Thus, when the locking mechanism 32 is in a locking configuration—the configuration in which the pawl 34 engages the ratchet gear 30—the arms 14*a* and 14*b* can only slide inwardly relative to the housing 20, while their outward movement is precluded because the pinion gear 28 cannot rotate in reverse due to engagement between the ratchet gear 30 and the pawl 34.

The locking mechanism 32 further includes a biasing element 37, which is operatively connected to the pawl 34 and urges the pawl 34 into engagement with the ratchet gear 30.

To secure the laptop 12 within the anti-device 10, the U-shaped grips 16*a* and 16*b* must be initially separated by a distance exceeding the width of the laptop 12, thereby permitting the laptop 12 to be positioned onto the stand 18 with the lid portion of the laptop opened, as depicted in FIG. 1B. Then, the arms 14*a* and 14*b* are retracted into housing 20, thereby reducing the distance between the grips 16*a* and 16*b* until they receive the edges of the lid portion of the laptop 12 therein, as depicted in FIG. 1A. At this point, the laptop 12 is secured within the anti-theft device 10.

To remove the laptop computer 12 from the anti-theft device 10, the pawl 34 must be disengaged from the ratchet gear 30, as depicted in FIG. 4B, thus enabling the gear assembly 26 (including the pinion gear 28) to rotate in reverse. Then, while the pawl 34 remains retracted away from the ratchet gear 30, the user must slide the arms 14*a* and 14*b* apart until the distance between the U-shaped grips 16*a* and 16*b* exceeds the width of the laptop 12, at which point the laptop 12 can be removed from the stand 18. The pawl 34 can then be transitioned into is locking configuration in which the pawl 34 operatively engages the ratchet gear 30, as depicted in FIG. 4A, and the anti-theft device 10 is ready to secure the laptop 12, as disclosed above.

Figure 5A:
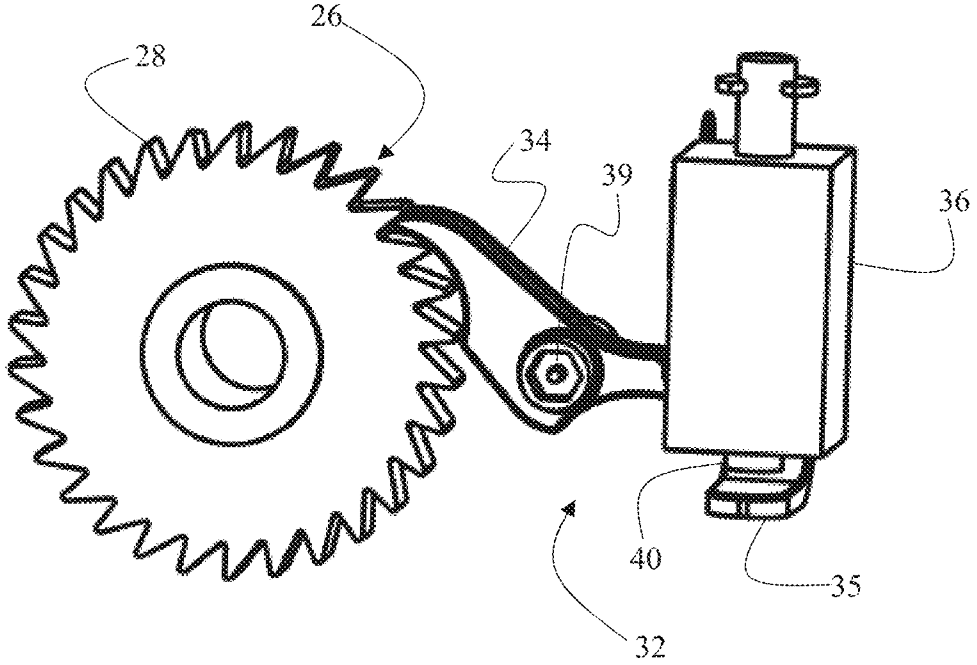
FIG. 5A is a back view of the locking mechanism engaging the gear assembly in a locking configuration of the anti-theft device.
Figure 5B:
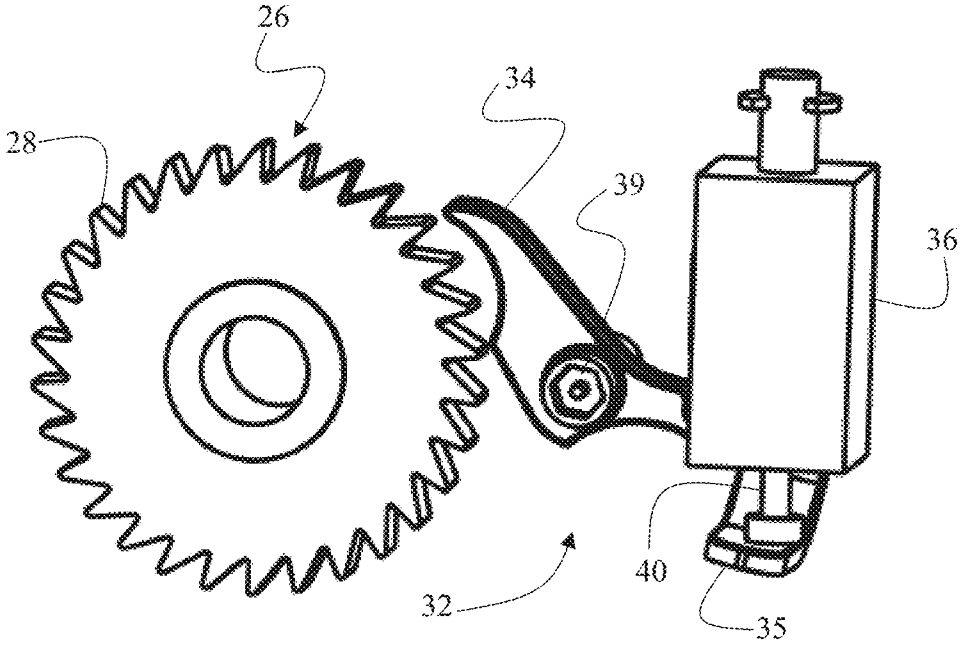
FIG. 5B is a back view of the locking mechanism disengaged from the gear assembly in an unlocked configuration of the anti-theft device.
Figure 6:
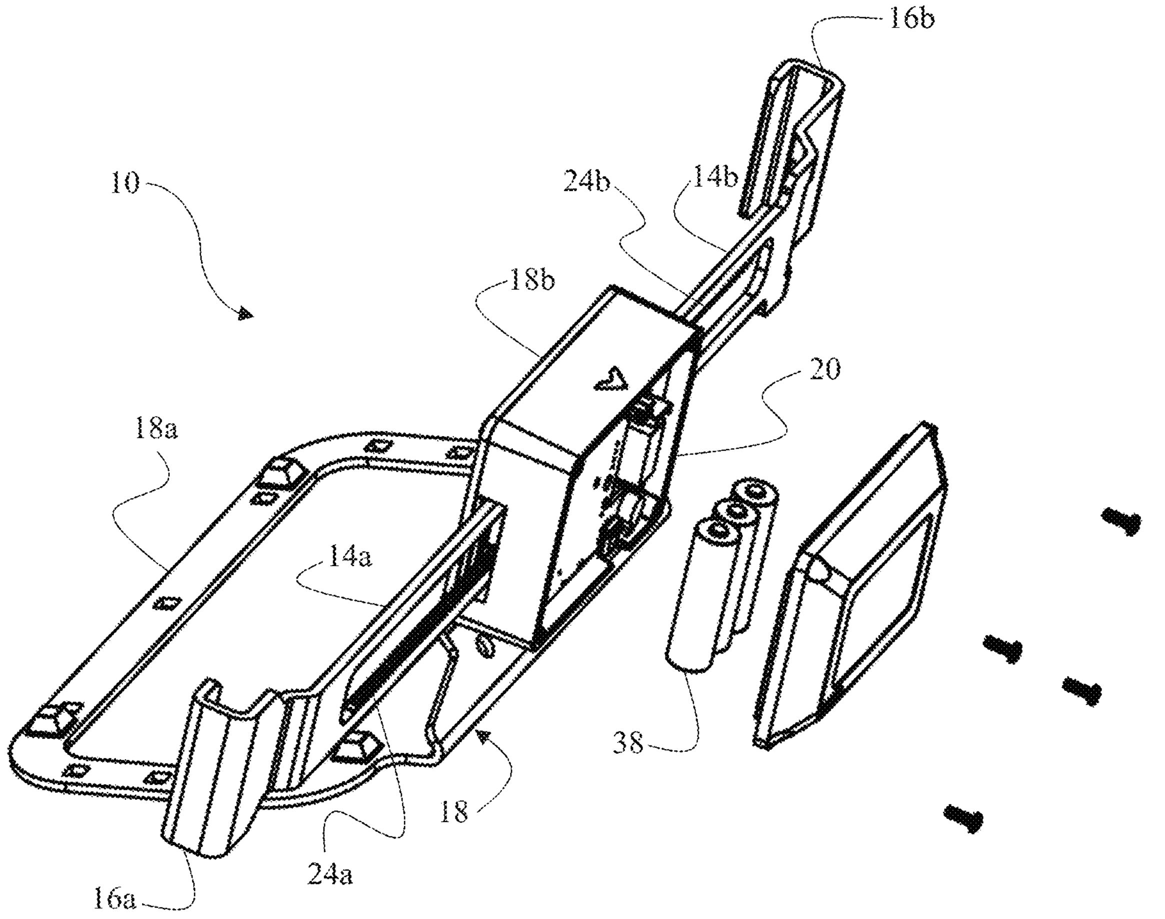
FIG. 6 is an exploded perspective view of the anti-theft device.

FIGS. 5A and 5B depict that the locking mechanism 32 may include an actuator, such as a solenoid 36, an electric motor, a pneumatic actuator, a magnetic actuator, or any other type of actuator known in the art. FIG. 6 depicts that the locking mechanism 32 is disposed within the housing 20 and may be electrically connected to a power source 38, such as a battery, which also may be disposed within the housing 20 and electrically connected to the solenoid 36 via a switch. In the locking configuration, depicted in FIG. 5A, the switch is opened and the electric current from the power source 38 is not conveyed to the solenoid 36. The piston 40 of the solenoid 36 is retracted away from the tail 35 of the pawl 34, which is disposed on the opposite side of the fulcrum 39 relative to the pawl's operating end. In this locking configuration, the biasing element 37 presses the pawl 34 against the ratchet gear 30. Because the pawl 34 precludes the gear assembly 26 from rotating in reverse, the retaining the arms 14*a* and 14*b* are in the locked state, whereby the engagement between the gear racks 24*a* and 24*b* and the pinion gear 28 precludes the arms 14*a* and 14*b* from being extended out of the housing 20. In an embodiment, the stand 18, the arms 14*a* and 14*b* and the gear assembly 26 are made out of a metal or a metal alloy (such as steel), thereby reducing the likelihood of forced or accidental damage to these components, ensuring the longevity and the high level of security provided by the anti-theft device 10.

FIG. 5B depicts the unlocked configuration of the locking mechanism 32. In this configuration, the switch connecting the solenoid 36 to the power source 38 is closed and the solenoid 36 is an energized state. The piston 40 extends from the solenoid 36 and applies a force onto the tail 35 of the pawl 34. The force applied onto the tail 35 of the pawl 34 exceeds the biasing force exerted onto the pawl 34 by the biasing element 37. This causes the pawl 34 to pivot away from and disengage the ratchet gear 30, thereby transitioning the locking mechanism 32 into the unlocked configuration, in which the gear assembly 26 can rotate in reverse, which releases the arms 14*a* and 14*b* to outwardly extend relative to the housing 20.

Figure 7:
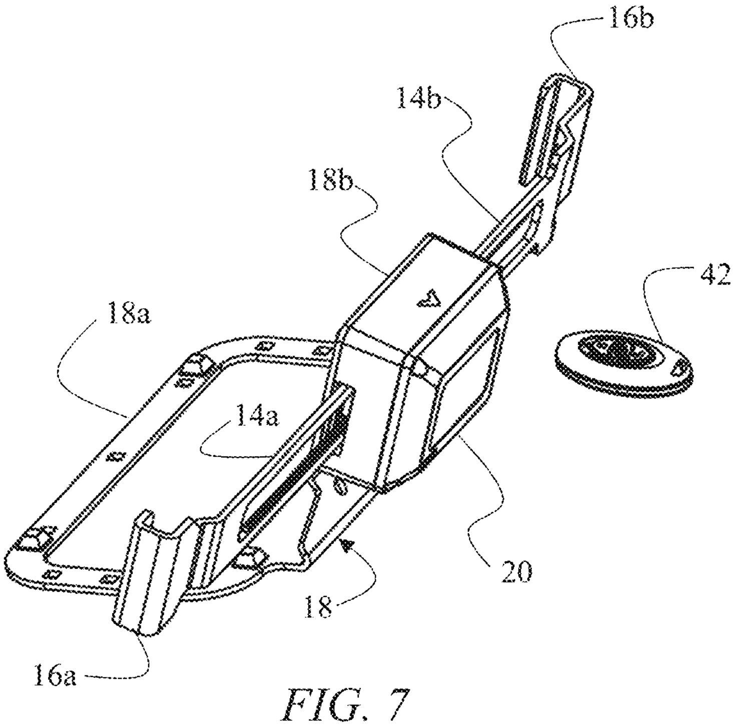
FIG. 7 is an perspective view of the anti-theft device and a security fob for transitioning the anti-theft device into the unlocked configuration.

Thus, to actuate the solenoid 36, the switch must be closed, forming an electrical circuit between the power source 38 and the solenoid 36. A switch may be configured to be closed in response to a predefined wireless signal. FIG. 7 depicts a wireless fob 42 configured to transmit such signal to a corresponding receiver within the housing 20. Examples of the wireless signals and the corresponding transmitter and receiver devices may include the following: infrared (IR), radio frequency (RF), near-field communications (NFC), Wi-Fi, UWB (UltraWideBand), BT or BLE (Bluetooth or Bluetooth Low Energy), Cellular/5G/6G, LoraWAN, audio/voice commands, magnetics, etc.

When an authorized user actuates the wireless signal transmitter—for example by pressing a button on the fob 42—the receiver within the housing 20 receives the wireless signal and actuates the solenoid 36 (or another actuator). The piston 40 of the solenoid 36 extends and applies a force onto the tail 35 of the pawl 34, thereby causing the pawl 34 to pivot about fulcrum 39 away from the ratchet gear 30. When the pawl 34 is in this disengaged position, the user can slide the arms 14*a* and 14*b* outwardly relative to the housing 20 so that the distance between the U-shaped grips 16*a* and 16*b* exceeds the width of the laptop computer 12, as depicted in FIG. 1B. At this point, the laptop computer 12 may be removed from the anti-theft device 10. The user can then use the fob 42 to transmit another predefined wireless signal to the anti-theft device 10 to open the switch and deactivate the solenoid 36. When the piston 40 of the solenoid 36 retracts away from the tail 35 of the pawl 34, the biasing element 37 returns the pawl 34 into the operative engagement with the ratchet gear 30, thereby transitioning the anti-theft device 10 into the locking configuration. The biasing element 37 may be a coil spring that biases the pawl 34 toward its engaged position, and when the piston 40 of the solenoid 36 is retracted away from the tail 35 of the pawl 34, the biasing force causes the pawl 34 to reengage the ratchet gear 30.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device for securing an article of merchandise, comprising:

a stand having a base portion configured to be anchored to a display surface and configured to support the article of merchandise thereon;

a housing mounted to the stand;

an adjustable arm having a first portion slidingly disposed within the housing and a second portion positioned outside the housing and terminating with a grip, wherein the grip is configured to receive an edge of the article of merchandise when the adjustable arm is in a closed position;

a gear rack disposed along the first portion of the adjustable arm;

a pinion gear rotationally disposed within the housing and operatively engaged with the gear rack of the adjustable arm, wherein inward retraction of the adjustable arm relative to the housing requires the pinion gear to rotate in a first direction and outward extension of the adjustable arm relative to the housing requires the pinion gear to rotate in the second direction;

a ratchet gear rotationally disposed within the housing and joined to the pinion gear in a concentric alignment, the pinion gear and the ratchet gear collectively forming a gear assembly;

a pawl pivotally disposed within the housing and operatively engaging the ratchet gear, wherein the pawl permits the gear assembly to rotate in the first direction and precludes the gear assembly from rotating in the second direction, thereby permitting the adjustable arm to retract inwardly relative to the housing and precluding the adjustable arm from extending outwardly relative to the housing;

a biasing element operatively connected to the pawl and applying a biasing force urging the pawl into operative engagement with the ratchet gear; and an actuator disposed within the housing, wherein in an actuated state, the actuator counteracts the biasing force of the biasing element, disengaging the pawl from the ratchet gear and thus releasing the gear assembly to rotate in the second direction thereby permitting the adjustable arm to extend outwardly relative to the housing into an open position in which the grip disengages the edge of the article of merchandise, permitting removal thereof from the stand.

2. The anti-theft device of claim 1, wherein the article of merchandise is a laptop computer and wherein the grip is U-shaped and permits an edge of a lid portion of the laptop to translate in a transverse direction relative thereto.

3. The anti-theft device of claim 2, wherein the grip does not engage the base portion of the laptop computer while the base portion is at rest, thereby permitting the laptop computer to be lifted from the stand, wherein lifting the laptop computer causes the edge of the lid portion to translate transversely within the U-shaped grip while remaining secured therein.

4. The anti-theft device of claim 1, wherein the actuator is a solenoid.

5. The anti-theft device of claim 4, wherein the pawl is configured to pivot about a fulcrum and wherein the pawl has a tail positioned on the opposite side of the fulcrum relative to an operating end, and wherein a piston of the solenoid is configured to apply a force onto the tail of the pawl thus causing the pawl to pivot about the fulcrum, thereby disengaging the operating end thereof from the ratchet gear.

6. The anti-theft device of claim 5, wherein a power source is disposed within the housing and electrically connected to the solenoid via a switch, wherein the switch has a closed state in which an electrical circuit is closed between the power source and the solenoid and an open state in which the electrical circuit therebetween is broken.

7. The anti-theft device of claim 6, further comprising a fob configured to transmit a signal and a receiver disposed within the housing configured to detect the signal, wherein detection of the signal by the receiver triggers the switch to transition between the open state and the closed state, thereby selectively energizing the solenoid to disengage the pawl from the ratchet gear or selectively de-energizing the solenoid to return the pawl into engagement with the ratchet gear.

8. The anti-theft device of claim 1, wherein the adjustable arm has a window configured to receive the pinion gear therein, and wherein the gear rack is disposed on a longitudinal inner edge of the window.

9. The anti-theft device of claim 8, wherein when the terminal edge of the window contacts the pinion gear, the adjustable arm is restrained against further outward extension relative to the housing, thereby precluding removal of the adjustable arm from the housing.

10. The anti-theft device of claim 1, wherein the adjustable arm is a first adjustable arm and the grip is a first grip, further comprising a second adjustable arm with a second grip slidingly disposed within the housing, wherein the first and the second grips are positioned on the opposite sides of the housing and are configured to receive opposite edges of the article of merchandise.

11. The anti-theft device of claim 10, wherein a second gear rack is disposed along the second adjustable arm and operatively engages the pinion gear, and wherein the first and the second gear racks are disposed in an opposing relationship with one another relative to the pinion gear, such that the pinion gear translates linear movement of the first adjustable arm to the second adjustable arm, thereby synchronizing inward retraction and outward extension of the first and the second adjustable arms.

12. A method of securing an article of merchandise using an anti-theft device, comprising:

affixing a stand of the anti-theft device to a display surface, the stand having a base portion configured to support the article of merchandise thereon;

linearly extending an adjustable arm from a housing mounted to the stand, wherein the adjustable arm has a first portion slidingly disposed within the housing and a second portion positioned outside the housing and terminating with a grip, wherein the grip is configured to receive an edge of the article of merchandise when the adjustable arm is retracted into a closed position;

placing the article of merchandise onto the base of the stand;

aligning the edge of the article of merchandise with the grip;

inwardly retracting the adjustable arm into the housing such that the grip receives the edge of the article of merchandise, wherein a pinion gear is rotationally disposed within the housing and operatively engaged with a gear rack disposed along the first portion of the adjustable arm, wherein inward retraction of the adjustable arm requires the pinion gear to rotate in a first direction and outward extension of the adjustable arm requires the pinion gear to rotate in the second direction, and wherein a ratchet gear is rotationally disposed within the housing and joined to the pinion gear in a concentric alignment such that the pinion gear and the ratchet gear collectively form a gear assembly, and wherein a pawl is pivotally disposed within the housing and is biased by a biasing element connected thereto into an operative engagement with the ratchet gear such that the pawl permits the gear assembly to rotate in the first direction and precludes the gear assembly from rotating in the second direction, thereby permitting the adjustable arm to retract inwardly relative to the housing and precluding the adjustable arm from extending outwardly relative to the housing, thereby locking the article of merchandise within the grip of the adjustable arm;

energizing an actuator disposed within the housing, wherein the actuator retracts the pawl away from the ratchet gear by counteracting a biasing force exerted onto the pawl by the biasing element, thereby releasing the gear assembly to rotate in the second direction, thus enabling the adjustable arm to extend outwardly; and outwardly extending the adjustable arm relative to the housing until the grip of the adjustable arm disengages the edge of the article of merchandise, thereby permitting removal of the article of merchandise from the stand.

13. The method of claim 12, wherein the article of merchandise is a laptop computer and wherein the grip is U-shaped and permits an edge of a lid portion of the laptop to translate in a transverse direction relative thereto.

14. The method of claim 13, further comprising a step of lifting the laptop computer from the stand while the edge of the lid portion thereof remains secured within the grip, whereby the edge of the lid portion of the laptop translates transversely within the U-shaped grip as the laptop computer is lifted.

15. The method of claim 12, wherein the actuator is a solenoid.

16. The method of claim 15, wherein the energizing step causes a piston of the solenoid to extend and apply a force onto a tail of the pawl located on the opposite side of a fulcrum, thereby causing the pawl to pivot about the fulcrum, thus disengaging the pawl from the ratchet gear.

17. The method of claim 16, wherein a power source is disposed within the housing and electrically connected to the solenoid via a switch, wherein the switch has a closed state in which an electrical circuit is closed between the power source and the solenoid and an open state in which the electrical circuit therebetween is broken, and wherein the energizing step transitions the switch into the closed state.

18. The method of claim 17, wherein the energizing step comprises a step of operating a fob to transmit a signal configured to be detected by a receiver disposed within the housing, whereby responsive to the receiver detecting the signal, triggering the switch to transition between the open state and the closed state, thereby selectively energizing the solenoid to disengage the pawl from the ratchet gear or selectively de-energizing the solenoid to return the pawl into operating engagement with the ratchet gear.

19. The method of claim 12, wherein the adjustable arm is a first adjustable arm and the grip is a first grip, and wherein a second adjustable arm having a second grip is slidingly disposed within the housing, wherein the first and the second grips are positioned on the opposite sides of the housing and are configured to receive opposite edges of the article of merchandise.

20. The method of claim 19, wherein a second gear rack is disposed along the second adjustable arm and operatively engages the pinion gear, and wherein the first and the second gear racks are positioned in an opposing relation with one another relative to the pinion gear, whereby the step of inwardly retracting the first adjustable arm causes the second adjustable arm to inwardly retract and the step of outwardly extending the first adjustable arm causes the second adjustable arm to outwardly extend.

* * * * *